A. R. BAUDER.
METHOD OF AND MEANS FOR DETERMINING AND INDICATING THE DEPTH OF WATER.
APPLICATION FILED SEPT. 22, 1911.
1,212,438.
Patented Jan. 16, 1917.
2 SHEETS—SHEET 1.
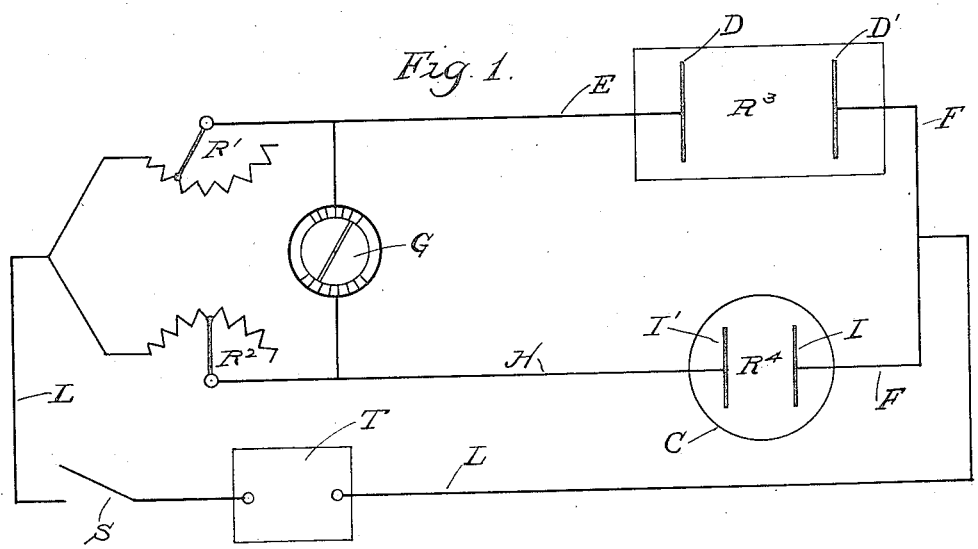
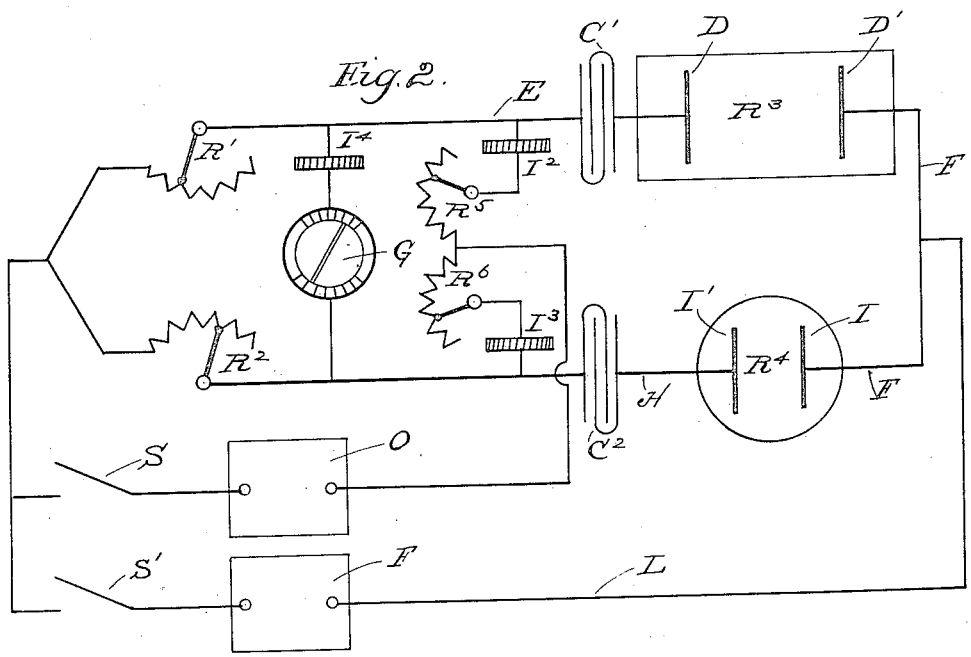

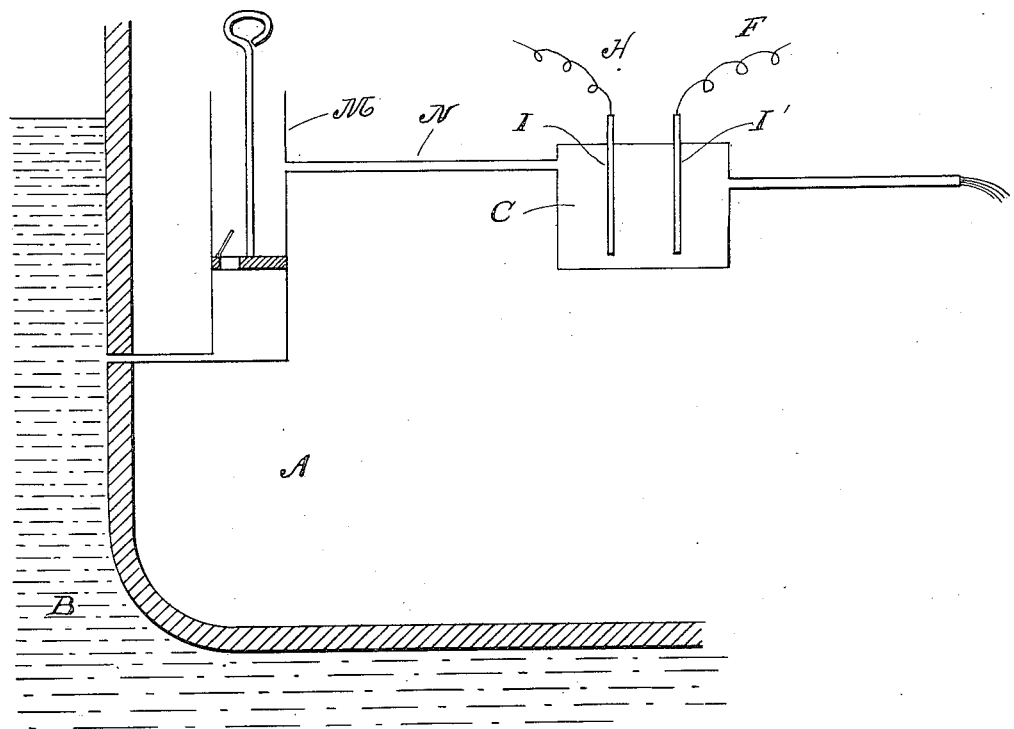

UNITED STATES PATENT OFFICE.

ARTHUR R. BAUDER, OF NORTH HAVEN, CONNECTICUT.

METHOD OF AND MEANS FOR DETERMINING AND INDICATING THE DEPTH OF WATER.

1,212,438.

Specification of Letters Patent.

Patented Jan. 16, 1917.

Application filed September 22, 1911. Serial No. 650,774.

*To all whom it may concern:*

Be it known that I, ARTHUR R. BAUDER, of the town of North Haven, county of New Haven, and State of Connecticut, have invented new and useful Improvements in Methods of and Means for Determining and Indicating the Depth of Water, of which the following is a full, clear, and exact description when taken in connection with the accompanying drawings, which form a part thereof.

This invention relates to a method of and means for automatically determining and indicating the depth of water surrounding a ship or other object carrying the indicator, and it is based upon the principle that the electrical conductivity of a body of water varies in proportion to its depth. This method is a differential one. It is carried into effect by having in circuit the water in which the ship floats and a suitable current strength indicator or potential indicator, which is preferably so controlled as to be irresponsive to changes in conductivity due to causes other than changes in the depth or the presence of metallic bodies or minerals, but is arranged to respond to and denote any change in conductivity due to the variations in depth of the water or metallic bodies or minerals.

The invention therefore may comprise the method of and means for placing in circuit the body of water in which the ship floats and a resistance measuring device, such as a Wheatstone bridge, and balancing the potential at the junction of two arms against the potential of the junction of two other arms of a Wheatstone network upon a certain predetermined depth of water to provide a zero or other initial indicating point on the measuring device, the said measuring device being calibrated in graduations whereby changes in the current due to changes in depth will be indicated thereon.

More specifically and in its preferred embodiment, the invention comprises in connection with a source of electric current, a Wheatstone bridge or similar balanced current measuring device, having a divided circuit, one branch of which includes the body of water in which the ship floats, and another branch of which includes a vessel containing water drawn from the body of water immediately surrounding the ship, or other agency to compensate for changes in the conductivity of the surrounding water due to other causes than changes in depth, so that the ratios of currents or ratios of resistances in these two arms may be equal at a certain depth and changes in the salinity, temperature or other conductive conditions of the water will not affect this ratio, but the galvanometer employed as indicator will remain at rest until changes in conductivity due to changes in depth or causes other than the state of the water occur. As such depth varies from the predetermined depth whereat the ratios are equal these ratios will change, and consequently the indicator will move from its position of rest corresponding to the predetermined depth to a position indicating greater or less depth.

The galvanometer measures the variations in the ratios of the currents in the pairs of arms of the Wheatstone bridge and thereby the resistance or conductivity of the water in which the ship floats relative to that of the water in the vessel on the ship, and in the use of the device, after a point of equilibrium has been established by rheostats, or other suitable means, the galvanometer will indicate any change in the relative conductivity of the water outside of the ship and that within the vessel on the ship.

The invention further consists of the several improvements and combinations of parts set forth and claimed hereinafter.

Referring to the drawings, Figure 1 is a diagrammatic illustration of the invention applied to a ship, Fig. 2, a similar view of a modified form, and Fig. 3, a sectional detail view of a part of the hull of a ship, a vessel carried by the ship, and a pump intermediate the vessel and water in which the ship floats.

In all figures, similar letters of reference represent like parts.

In the drawings, the letter A designates a ship floating in water B of any depth.

C designates a water containing vessel adapted to be located at any suitable place upon the ship A.

Below the water line of the ship are secured two separated terminal plates D and D' of electrical conducting material, which are insulated from the hull of the ship, and are of such material that they will not be acted upon by the water in which the ship floats. The terminal plates are preferably applied to the hull of the ship at the bow and stern respectively, although this arrangement is not absolutely essential. To these plates D and D' are connected conductors E and F, the conductor F being also connected to a plate I in the water containing vessel C. To the other plate I' of the vessel C another conductor H is connected, and between and in circuit with the conductors E and H is located a galvanometer G which occupies the usual position in a Wheatstone bridge arrangement. The plates I and I', like the plates D and D' are of such material that they will not be acted upon by the water.

One end of a rheostat R' is connected to the junction of a rheostat R² and the conductor L, the other end of R' is connected to the junction of the terminal of the galvanometer G and the conductor E. One end of the rheostat R² is connected to the junction of rheostat R' and the conductor L, the other end of R² being connected to the junction of the terminal of the galvanometer G and the conductor H. The generator T is connected to the conductor L' and also to the junction of conductors F from the plates D' and I.

The rheostats R' and R² are preferably made of a material possessing a high temperature coefficient of resistance, so that a given change in current will cause a considerable and definite evolution of heat, which in turn will cause a relatively large change in resistance, in accordance with the principle that: the quantity of heat developed in a conductor is proportional to the square of the current strength, and that the change in resistance of a conductor is very nearly proportional to the change in temperature for materials having a positive temperature coefficient of resistance, such as pure metals, and very nearly inversely proportional to the change in temperature for materials having a negative temperature coefficient of resistance, such as carbon or electrolytes.

The rheostats R' and R² are preferably made in the following manner; viz: of small mass and of relatively high resistance, so that a small current will cause a considerable elevation of temperature; of large superficial area but small cross sectional area so as to facilitate rapid cooling by radiation, permitting of rapid adjustment; and inclosed in a vacuous space so as to prevent the erratic cooling by convection currents of gases with the attendant erratic instantaneous value of the resistance.

R³ and R⁴ designate the respective resistances of two branches of the circuit which include the water between the plates D, D' and I, I' respectively.

In the device of Fig. 1 an alternating current is used in order to avoid polarization effects.

The water within the vessel C is intended to be pumped continually from the body of water in which the ship is floating, by means of the pump M, which communicates with the vessel by means of the pipe N of insulating material, and sufficient overflow is provided to carry away the water after it has entered the vessel, so that so far as possible the water within the vessel will be the same in composition, salinity and temperature as that in which the ship may be at any given instant.

In practising the method and operating the device by the arrangement shown in Figs. 1 and 3, the pump having been set in action so as to continuously supply water from the body of water immediately surrounding the ship, to the vessel C, alternating current is sent through the circuit. Then the adjustable arms of the rheostats R', R² are adjusted so that the product of the resistances R' and R⁴ will equal the product of the resistances R² and R³ to thereby establish a balance between the resistances of the respective branches in which are included the outer body of water and that in the vessel, and thereupon the needle of the galvanometer will be brought to rest. To adjust the instrument so that the galvanometer will have no deflection at a given depth, the ship is moved into water of a known depth and the bridge is balanced for the conductivity corresponding to this depth, which may be, for instance, one hundred feet. The water being continually pumped into the vessel from the surrounding body, the same conditions of salinity and temperature will affect the conductivity of these two branches as the ship moves from point to point, thus maintaining in water of a uniform depth equal ratios of resistance in the arms and a balance of the bridge, and thus maintaining the indicator in a state of rest. When, however, the depth of the water without the ship increases or decreases and the conductivity of R³ is thereby increased or decreased, the galvanometer will indicate at once such variation between the ratios of resistances in the arms and thereby show the relative conductivity of the water without the ship as compared to that within the vessel, and thus the relative depth of the water outside the ship compared to the given depth is shown.

By having the resistances R' and R² of small thermal capacity and high temperature resistance coefficient, a small change in the resistance of $R^3$ and therefore of the amount of current flowing through $R^3$ will cause a considerable temperature change of $R'$, due to the change in the current, and therefore a considerable change of resistance. The large change in the resistance of $R'$ varies considerably the amount of current flowing through it, and as $R'$ and $R^2$ have comparatively large and opposite variations of resistance under the conditions noted the equilibrium of the system is noticeably upset, and the effect of the resistance change of $R^3$ is considerably multiplied at the galvanometer, whereby the instrument is made very sensitive.

The instrument gives the new value of the average depth of water in which the ship floats at any instant. A part of the electric current will pass through portions of water at considerable distances from the ship, but the quantity of electricity passing through these remote portions of water will approach a constant, and have little or no effect upon the instrument, inasmuch as I employ a differential method. As the ship passes into deeper water the conductivity of the water below and about the ship increases by virtue of the greater cross-sectional area, permitting an increased flow of alternating current through this body of water and through the corresponding resistance $R'$. The increased flow of current through $R'$ causes it to rise in temperature, and in case it is made of material having a high temperature coefficient of resistance, such as pure metal, its resistance will increase correspondingly. Since the electrical potential at any point in a conductor varies as the product of the current by the resistance of that portion of the conductor traversed by the current, it follows that the electrical potential of the conjunction of $R'$ and $R^3$, (indicating the conductivity of the water,) will rise above its previous value.

Conversely, when the ship passes into shallow water the disturbance of the bridge will be in the reverse direction causing a decreased current in $R'$ and $R^3$, and hence a decreased value of the potential at their junction. In any case, the change in potential, at the junction of $R'$ and $R^3$ or at the junction of $R^2$ and $R^4$ (which represents the resistance of the vessel C) varies as the product of the current traversing that ratio arm $R'$ or $R^2$ by the resistance of that particular ratio arm, whether the resistance vary much or little, or is substantially constant. When the potential of the junction of $R'$ and $R^3$ equals the potential of the junction of $R^2$ and $R^4$ the bridge is said to be balanced. A change in the depth of water in which the ship floats will cause the balance to be disturbed, i. e., the electrical potential of the junction of $R'$ and $R^3$ will be greater or less than that of the junction of $R^2$ and $R^4$ causing a current to pass from the higher to the lower potential through and be indicated by the galvanometer G.

In Fig. 2, means are shown for the employment of a direct current which is desirable on account of the greater effectiveness and reliability of direct current galvanometers. In this arrangement in addition to the alternating current generator and the network heretofore described, a direct current generator O is employed. Secondary rheostats $R^5$ and $R^6$, forming adjustable ratio arms are used for the direct current, and so connected that the direct current which passes through $R^5$ and $R^6$ will also pass through $R'$ and $R^2$ in addition to the alternating current which is also passing through the latter. Condensers $C'$, $C^2$ are employed to prevent the direct current from entering either the water in which the ship floats or the water contained in the vessel C, but such condensers permit the alternating current to pass through both bodies of water. Inductances $I^2$ and $I^3$, such as choke coils, prevent the alternating current from entering $R^5$ and $R^6$, or reduce its volume in those secondary ratio arms, and they assist in reducing the quantity of alternating current passing through the source of direct current. An inductance $I^4$ is provided in order to reduce the quantity of alternating current passing through the direct current galvanometer.

In the arrangement of Fig. 2, the first balancing of the bridge is done with the main bridge only, that is, $R'$, $R^2$, $R^3$ and $R^4$ using alternating current; then while the alternating current continues to flow, direct current is passed through $R^5$, $R^6$, $R'$, $R^2$ and the rheostats $R^5$ and $R^6$ are adjusted to the rheostats $R'$, $R^2$ which are used jointly by both the alternating and direct currents, and a readjustment is made until the proper balance is obtained, that is, the ratio of $R'$ to $R^2$ equals the ratio of $R^3$ to $R^4$, equals the ratio of $R^5$ to $R^6$. The ratios of resistance in $R'$, $R^2$, $R^5$ and $R^6$ are not altered thereafter.

The indicator will show proximity to a reef, submarine precipice or submarine bank, and in case the course of the ship makes an acute angle with the face of the submarine precipice or bank the ship may be stopped in time to avert disaster. If the indicator gives a reading indicating shallow water, while other conditions, such as the color of the water, point to the contrary, the inference is that the ship is near a reef, submarine precipice or bank. In any case, where the conditions and the readings of this instrument are incongruous the ship would naturally be stopped and an investigation made.

A sunken metallic ship, or a sunken wooden ship having a cargo of metal or ores of metal lying below a ship equipped with the indicator will cause the indicator of this instrument to deviate suddenly from the true reading of the depth. It will, however, immediately return to its proper reading of depth when the ship so equipped has passed from the neighborhood of the sunken ship.

Accumulations or deposits of metal, or ores of metal, on, or in, the bed of the body of water, will likewise cause the indicator of a ship so equipped to deviate suddenly from the true indications of depth, when the ship is in the neighborhood of these accumulations or deposits; and, again, the indicator will immediately give the true reading of depth when the ship bearing this instrument has passed out of the neighborhood of these accumulations or deposits mentioned above.

The indicator can thus be used to locate a sunken metallic ship, or a wooden ship having a cargo of metal, or ores of metal, or accumulations or deposits of metal, or ores of metal, on, or in, the bed of the body of water.

It will be understood that in both modifications of my invention shown in the drawings the depth of water beneath a ship is determined or ascertained by measuring the conductivity of an electric circuit, including the body of water floating the ship, and compensating for conductivity variations in the water portion of said circuit due solely to variations in the state of the water, i. e., variations in temperature, density or salinity. The measuring of the depth of water is, in short, obtained by comparing those successive factors or portions of the conductivity of the body of water surrounding the ship which are independent of the changing state of such water. Any indications by the indicating instrument of changes in the state of the water outside the ship are prevented by balancing with respect to said instrument that portion or factor of the conductivity of the water circuit due solely to the state of the water, as against a similar factor of the conductivity of a body of water constantly supplied to the ship from the surrounding water.

Having now described my invention, what I claim, is:—

1. The method of determining and indicating the depth of water or the presence of metallic bodies or minerals adjacent to a floating ship which consists in measuring the conductivity of an electric circuit including the body of water surrounding the ship, substantially as described.

2. The method of determining and indicating the depth of water or the presence of metallic bodies or minerals adjacent to a floating ship which consists in establishing an electric circuit through the water surrounding the ship and through an indicator controlled in operation by changes in conductivity in the circuit, substantially as described.

3. The method of determining and indicating automatically the depth of water adjacent to a floating ship, which consists in establishing an electric circuit including the water surrounding the ship and including an indicator subject to changes in conductivity in the circuit, and setting said indicator at an initial indication at a known depth of water, substantially as described.

4. The method of automatically determining and indicating the depth of water or the presence of metallic bodies or minerals adjacent to a floating ship, which consists in adjusting an electrical indicator in circuit with the water surrounding the ship to a certain position at a given depth of water, and preventing a change in said indicator by changes in conductivity of said circuit due to other causes than the depth of the water or the presence of metallic bodies or minerals in said water, substantially as described.

5. The method of determining and indicating automatically the depth of water adjacent to a floating ship, which consists in providing an electric circuit including the water surrounding said ship, and an electrical indicator, and constantly compensating for changes in the conductivity of the circuit due to causes other than the depth of water or the presence of metallic bodies in the water to prevent operation of the indicator by such other causes, substantially as described.

6. The method of determining and indicating the depth of water beneath a floating ship, which comprises establishing a divided electric circuit each branch of which includes an adjustable resistance, one of said branches also including the water about the ship, indicating the relative potentials of points in the respective branches by an instrument connecting the latter, and initially balancing such potentials at a known depth of water to set said indicator at an initial indication; substantially as described.

7. The method of determining and indicating the depth of water beneath a floating ship, which consists in measuring the conductivity of an electric circuit including the water about the ship, and compensating for conductivity variations in the water portion of said circuit, due to causes other than variations of depth and the presence of metallic bodies or minerals adjacent to the ship; substantially as described.

8. The method of determining and indicating the depth of water beneath a floating ship, which consists in measuring the conductivity of an electric circuit including the water about the ship, and compensating for conductivity variations in the water portion of said circuit due to variations in the state of the water; substantially as described.

9. The method of determining and indicating the depth of water beneath a floating ship, which consists in measuring the conductivity of an electric circuit including the water about the ship, and constantly compensating for conductivity variations in the water portion of said circuit due to variations in the temperature, density, and salinity of the water; substantially as described.

10. The method of determining and indicating the depth of water beneath a floating ship, which consists in measuring that factor or portion of the conductivity of the water about the ship which is independent of the state of such water; substantially as described.

11. The method of determining and indicating the depth of water beneath a floating ship which consists in comparing, as the ship moves through the water, those successive factors or portions of the conductivity of the water about the ship which are independent of the changing state of such water; substantially as described.

12. The method of determining the varying depths of water adjacent to a floating ship, which consists in determining the measure of unbalance between the conductivity of the water about the ship and the conductivity of a sample of such water contained in a vessel on the ship; substantially as described.

13. The method of determining the varying depths of water adjacent to a floating ship, which consists in measuring by means of a suitable instrument the conductivity of an electric circuit including the water about the ship, and preventing the indication by said instrument of conductivity variations due to changes in the state of such water, by balancing with respect to said instrument that portion or factor of the conductivity of the water portion of said circuit due solely to the state of the water, as against a similar factor of the conductivity of a body of water constantly supplied to the ship from the water about the same; substantially as described.

14. The method of determining and indicating the varying depths of water adjacent to a floating ship, which consists in establishing an electric circuit including said adjacent water and an indicator responsive to conductivity variations and constantly supplying water from the body immediately surrounding the ship to a resistance device in said circuit, substantially as described.

15. The method of determining the depth of water beneath a floating ship, which consists in comparing the conductivity of a branch of an electric circuit, including the water in which the ship floats, with that of another branch including the contents of a vessel carried by the ship, said vessel containing water replenished from the body surrounding the ship as the latter is moved from one point to another; substantially as described.

16. The method of determining and indicating automatically the depth of water adjacent to a floating ship, which consists in establishing an electric circuit including said adjacent body of water and an electrical indicator, and counter-balancing that change in conductivity of the water in which the ship is floating caused by changes in salinity, density and temperature by corresponding and proportionate changes in the conductivity of a body of water carried by said ship, and which is a sample of that in which the ship is floating at any instant, which changes are due to the same changes in salinity, density and temperature, substantially as described.

17. Means for determining and indicating automatically the depth of water or the presence of metallic bodies adjacent to a floating ship, comprising an electric circuit, including the water surrounding said ship, and an indicator in said circuit subject to the changes of conductivity of the circuit, substantially as described.

18. Means for determining and indicating the depth of water or the presence of metallic bodies adjacent to a floating ship, comprising an electrical circuit including the water surrounding said ship and a resistance controlled indicator in said circuit, substantially as described.

19. Means for determining and indicating the depth of water or the presence of metallic bodies adjacent to a floating ship, comprising an electric circuit, including the water surrounding said ship, a resistance controlled indicator, resistances for effecting such control adjustable to balance one another at a given depth of water, and means to vary one of said resistances as the specific conductivity of the body of water outside the ship varies, substantially as described.

20. Means for automatically determining and indicating the depth of water adjacent to a floating ship, comprising an electric circuit including the water surrounding said ship, a potential indicator, resistances controlling such indicator adjustable to set said indicator at an initial indication at a known depth of water, and means to prevent any effect on said indicator due to other causes than changes in the depth of water, substantially as described.

21. Means for determining the depth of water beneath a floating ship, comprising a Wheatstone bridge, including in one arm the water about the ship and in another arm a vessel on the ship constantly supplied with water from that about the ship; substantially as described.

22. Means for determining and indicating automatically varying depths of water adjacent to a floating ship, comprising a source of electricity, a divided electric circuit, a resistance controlled indicator connecting the branches of said circuit, one of said branches including said outside body of water, and an adjustable resistance, the other branch of said circuit including a vessel having a sample of the surrounding water, and another adjustable resistance, said vessel receiving constant supply from the body of water immediately surrounding the ship, substantially as described.

23. Means for determining and indicating the depth of water beneath a floating ship, comprising a source of alternating current on the ship, a divided electric circuit connected with said source, one branch of said circuit including the water about the ship and also including a resistance, another branch of said circuit including a second resistance and a vessel supplied with water from the body of water surrounding the ship, and an electric potential indicator connecting said branches; substantially as described.

24. The method of determining and indicating the depth of water, or the presence of metallic bodies or minerals adjacent to a floating ship, which consists in employing a Wheatstone network carrying alternating current in conjunction with a Wheatstone network carrying direct current, two arms and the galvanometer of said networks being identical, substantially as described.

25. Means for determining and indicating the depth of water beneath a floating ship, comprising a Wheatstone network carrying alternating current in conjunction with a Wheatstone network carrying direct current, two arms and a galvanometer of said networks being identical, and means for preventing the passage of alternating current into the galvanometer; substantially as described.

26. Means for determining and indicating the depth of water beneath a floating ship, comprising a Wheatstone network carrying alternating current in conjunction with a Wheatstone network carrying direct current, two arms and a galvanometer of said networks being identical, means for preventing the passage of alternating current into the galvanometer, means for preventing the alternating current from passing into those arms of the direct current network intended to carry direct current only, and other means for preventing the passage of direct current into those arms of the alternating current network intended to carry alternating current only; substantially as described.

27. Means for determining and indicating the depth of water, or the presence of metallic bodies or minerals adjacent to a floating ship, comprising an electric circuit including a conductor composed of a material possessing a high temperature coefficient of resistance, having the property of changing in resistance with some function of the temperature; the development of heat varying with the square of the current passing through said conductor, to produce a valve-like action on the current, substantially as described.

28. Means for determining and indicating the depth of water, or the presence of metallic bodies or minerals adjacent to a floating ship, comprising an electric circuit including a conductor composed of a material possessing a high temperature coefficient of resistance, having the property of changing in resistance with some function of the temperature, the development of heat varying with the square of the current passing through said conductor, to produce a valve-like action on the current, disturbing the balance of potentials and thereby actuating the indicator, substantially as described.

29. The method of determining and indicating the depth of water, or the presence of metallic bodies or minerals, which consists in establishing an electric circuit including a conductor forming a part of a Wheatstone network having a relatively small mass but relatively high resistance so that a small current traversing it will cause a considerable elevation in temperature, with its accompanying increase in resistance, thus affecting the balance of potentials of the Wheatstone network, with its resultant effect upon the indicator, substantially as described.

30. Means for determining and indicating the depth of water, or the presence of metallic bodies or minerals, comprising an electric circuit including a conductor of relatively large superficial area but small cross-sectional area so as to facilitate rapid cooling by radiation, thus permitting a rapid adjustment of the instrument to the new conditions of depth and a rapid indication of these conditions, substantially as described.

31. Means for determining and indicating the depth of water, or the presence of metallic bodies or minerals, comprising an electric circuit including a conductor inclosed in a vacuous space or receptacle so as to prevent cooling by convection currents of gases, but permit of rapid cooling by radiation, substantially as described.

32. The method of automatically determining and indicating the presence of a reef or submarine precipice or bank whose face is parallel or oblique to the course of the ship, which consists in establishing an electric circuit including the water in which the ship floats whereby the presence of said reef or submarine precipice or bank decreases the conductivity of the circuit through the water thereby actuating an indicating instrument, substantially as described.

In witness whereof, I have hereunto set my hand on the 19th day of September, 1911.

ARTHUR R. BAUDER.

Witnesses:
SAMUEL H. FISHER,
ERROLL M. AUGER.